(12) United States Patent
Okamoto et al.

(10) Patent No.: US 8,029,150 B2
(45) Date of Patent: Oct. 4, 2011

(54) OUTER MIRROR FOR SIDE DOOR OF A VEHICLE

(75) Inventors: Shuuzi Okamoto, Shizuoka (JP);
Yoshikazu Terada, Fujieda (JP);
Hiroaki Horie, Shizuoka (JP)

(73) Assignee: Murakami Corporation, Shizuoka-shi (JP)

( * ) Notice: Subject to any disclaimer, the term of this patent is extended or adjusted under 35 U.S.C. 154(b) by 228 days.

(21) Appl. No.: 12/361,978

(22) Filed: Jan. 29, 2009

(65) Prior Publication Data

US 2009/0244744 A1 Oct. 1, 2009

(30) Foreign Application Priority Data

Mar. 28, 2008 (JP) .................... 2008-087159

(51) Int. Cl.
G02B 5/08 (2006.01)
G02B 7/18 (2006.01)
(52) U.S. Cl. ........................ 359/841; 359/844
(58) Field of Classification Search .............. 359/841
See application file for complete search history.

(56) References Cited

U.S. PATENT DOCUMENTS 6,390,630 B1 * 5/2002 Ochs ..................... 359/841

FOREIGN PATENT DOCUMENTS

| EP | 1 281 573 A2 | 2/2003 |
|---|---|---|
| EP | 1 281 573 A3 | 2/2003 |
| JP | 4-2744 U | 1/1992 |
| JP | 8-132965 | 5/1996 |
| JP | 11-78695 | 3/1999 |
| JP | 2000-318522 | 11/2000 |
| WO | WO 03/033303 A1 | 4/2003 |

* cited by examiner

*Primary Examiner* — Stephone Allen
*Assistant Examiner* — Jade Chwasz
(74) *Attorney, Agent, or Firm* — Oblon, Spivak, McClelland, Maier & Neustadt, L.L.P.

(57) ABSTRACT

An outer mirror includes: a mirror base which is attached to a side surface of a vehicle body of a vehicle; a shaft which is erected on the mirror base; and a mirror housing which is rotatably attached to the shaft and is provided with a mirror for reflecting a rearward of the vehicle body. The shaft is exposed in a gap between a top surface of the mirror base and a bottom surface of the mirror housing. The shaft includes at least one of a concave portion or a convex portion on a part of an outer circumferential surface of the shaft which faces to a front side of the vehicle body.

10 Claims, 6 Drawing Sheets

OUTER MIRROR FOR SIDE DOOR OF A VEHICLE

CROSS REFERENCE TO RELATED APPLICATIONS

This application claims the foreign priority benefit under 35 U.S.C. §119 of Japanese Patent Application No. 2008-087159 filed on Mar. 28, 2008, the disclosure of which is incorporated herein by reference.

BACKGROUND OF THE INVENTION

1. Field of the Invention

The present invention relates to an outer mirror that is attached to a side door of a vehicle or to the vicinity of the side door.

2. Description of the Related Art

A conventional outer mirror includes, as its main parts, a mirror base attached to a side surface of a vehicle body, a shaft erected on the mirror base, a mirror housing that is rotatably attached to the shaft and is provided with a mirror for reflecting the rearward of a vehicle.

In such an outer mirror, since the mirror housing is rotatable with respect to the mirror base, the top surface of the mirror base and the bottom surface of the mirror housing are opposed to each other with some gap in between. Because of the gap, a whistling noise is generated by a wind blowing through the gap between the mirror base and the mirror housing when the vehicle is running.

In some conventional mirrors, a plurality of dimples is formed on the top surface of the mirror base or the bottom surface of the mirror housing to generate a turbulence in the wind blowing through the mirror base and the mirror housing so that whistling noise is reduced (disclosed in Japanese Patent Application Publication No. 11-78695), for example.

The above described configuration in which a plurality of dimples is formed on the top surface of the mirror base or the bottom surface of the mirror housing, however, has a problem that the whistling noise can not be reduced which is generated by a wind hitting the outer circumferential surface of the shaft exposed in the gap between the mirror base and the mirror housing.

SUMMARY OF THE INVENTION

The present invention has been made in an attempt to provide an outer mirror which enables to reduce a whistling noise that is generated by a wind hitting a shaft exposed in the gap between the mirror base and the mirror housing.

An aspect of the present invention provides an outer mirror including: a mirror base which is attached to a side surface of a vehicle body of a vehicle; a shaft which is erected on the mirror base; and a mirror housing which is rotatably attached to the shaft and is provided with a mirror for reflecting a rearward of the vehicle body. The shaft is exposed in a gap between a top surface of the mirror base and a bottom surface of the mirror housing. The shaft includes at least one of a concave portion or a convex portion on a part of an outer circumferential surface of the shaft which faces to a front side of the vehicle body.

In the aforementioned outer mirror, the convex portions may be ribs which protrude along an axial direction of the shaft.

In the aforementioned outer mirror, the concave portions may be grooves provided along the axial direction of the shaft.

Other features and advantages of the present invention will become more apparent from the following detailed descriptions of the invention when taken in conjunction with the accompanying drawings.

BRIEF DESCRIPTION OF THE INVENTION

DETAILED DESCRIPTION OF THE INVENTION

An embodiment of the present invention is described below in detail with reference to the accompanying drawings as appropriate.

In the description of embodiments, like reference numbers indicate identical elements, and description of identical elements is not repeated. In the following explanation, terms that indicate directions, such as "front-rear", "right-left", "up-down" indicate the same directions as the directions of a vehicle body.

First Embodiment

Figure 1:
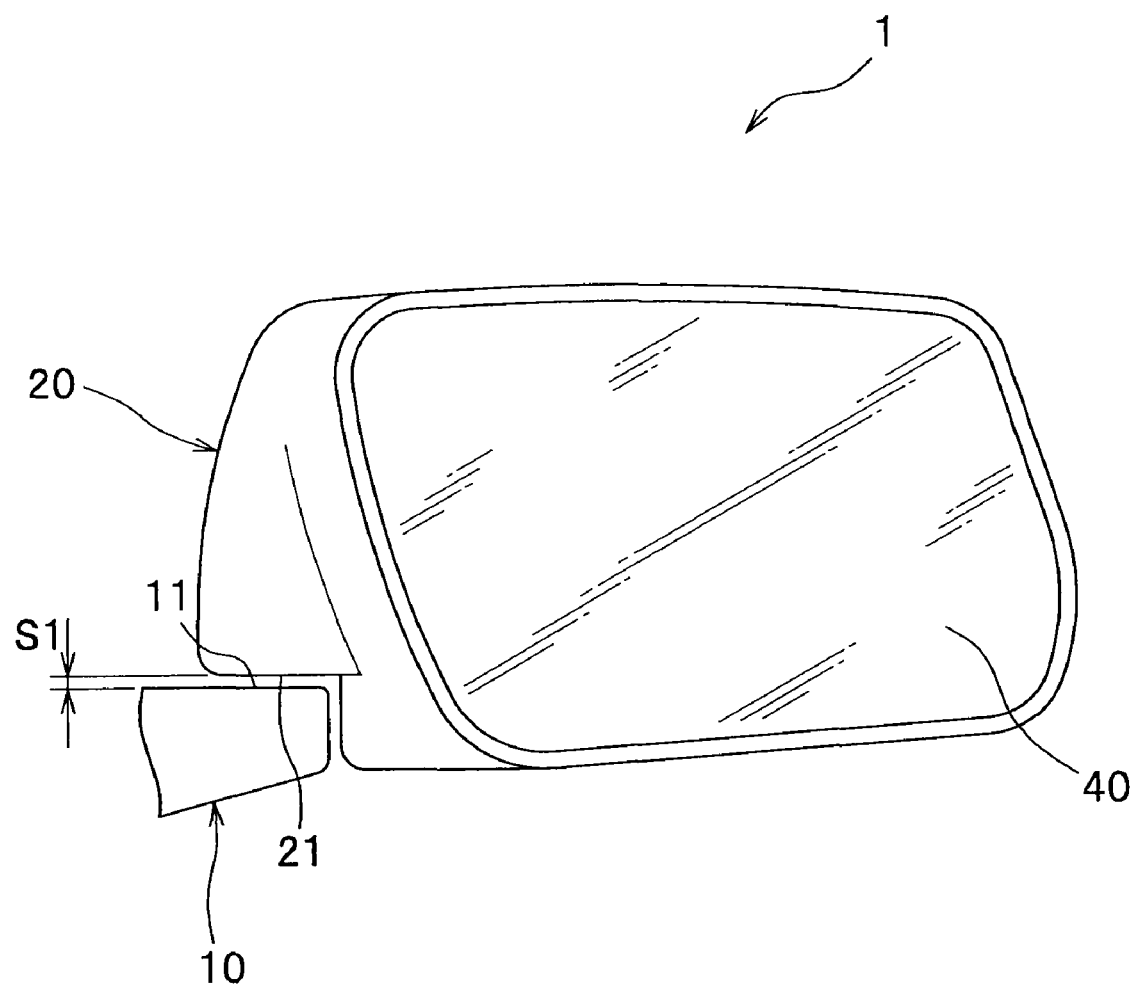
FIG. 1 is a front view of an outer mirror according to a first embodiment of the present invention.

An outer mirror 1 shown in FIG. 1 is a so-called door mirror which is attached to a front side door of a vehicle. The outer mirror 1 includes a mirror base 10 attached to a side surface of a vehicle body, a shaft 30 (see FIG. 2) erected on the mirror base 10, and a mirror housing 20 that is rotatably attached to the shaft 30 above the mirror base 10 and is provided with a mirror 40 for reflecting the rearward of the vehicle body.

Figure 2:
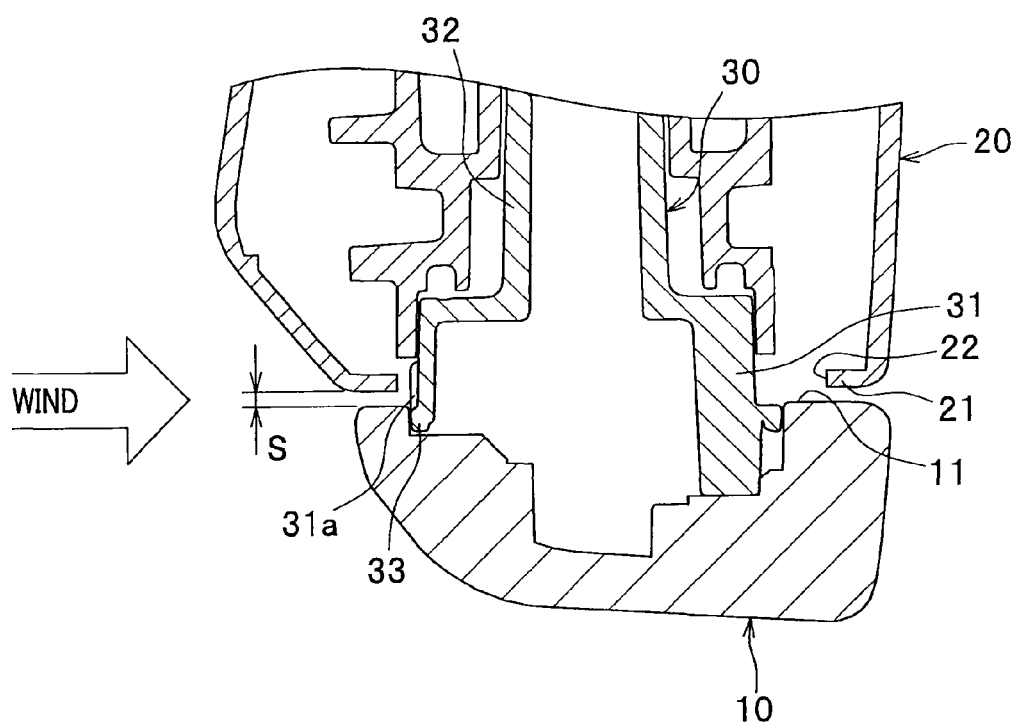
FIG. 2 is a sectional side view of the outer mirror according to the first embodiment.

The mirror housing 20 is a hollow box made of resin material. The mirror housing 20 is attached to the shaft 30 via a driving unit (not shown) in such a manner that the mirror housing 20 is horizontally rotatable about the shaft 30 as shown in FIG. 2. Since the mirror housing 20 is rotatable with respect to the mirror base 10, a top surface 11 of the mirror base 10 and a bottom surface 21 of the mirror housing 20 are opposed to each other with some gap S in between.

The mirror base 10 of the outer mirror 1, the mirror housing 20 and the driving unit (not shown) employ commonly-known configurations, and thus the descriptions thereof is omitted herefrom.

Figure 3:
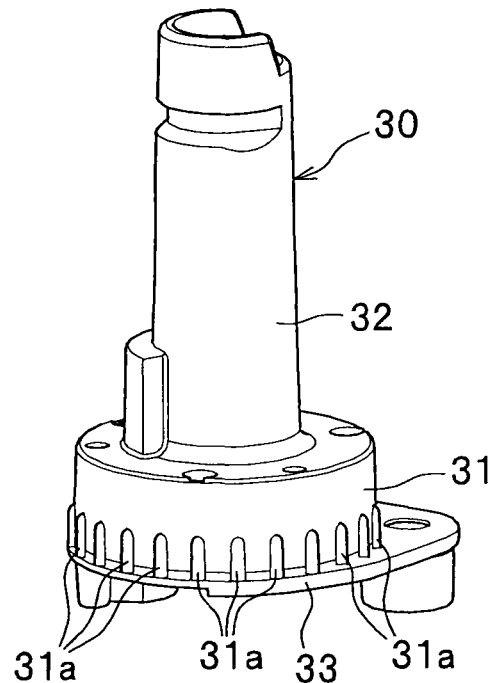
FIG. 3 is a perspective view of a shaft according to the first embodiment.

As shown in FIG. 3, the shaft 30 is a cylindrical resin or metallic member of which axial direction is perpendicular. The shaft 30 includes a base part 31 at its lower part and a supporting part 32 which extends upward from the base part 31. The diameter of the base part 31 is made larger than that of the supporting part 32. The base part 31 is provided with a flange 33 extending in the horizontal direction around its bottom circumferential edge.

As shown in FIG. 2, the flange 33 of the base part 31 is fixed to a top surface 11 of the mirror base 10. An upper part of the base part 31 and the supporting part 32 is inserted through an opening 22 formed on a bottom surface 21 of the mirror housing 20 and extends in the inner space of the mirror housing 20.

As shown in FIG. 3, a plurality of ribs 31a . . . is projected outward from the lower outer circumferential surface of the base part 31. The plurality of ribs 31a . . . extends in the axial direction of the shaft 30 from the top surface of the flange 33 to the substantially center of the base part 31 in the height direction. Each rib 31a is a convex-shaped part of which axial cross section is semicircular, and is formed in such a manner that the rib 31a does not project outward beyond the outer circumferential surface of the flange 33.

Figure 4:
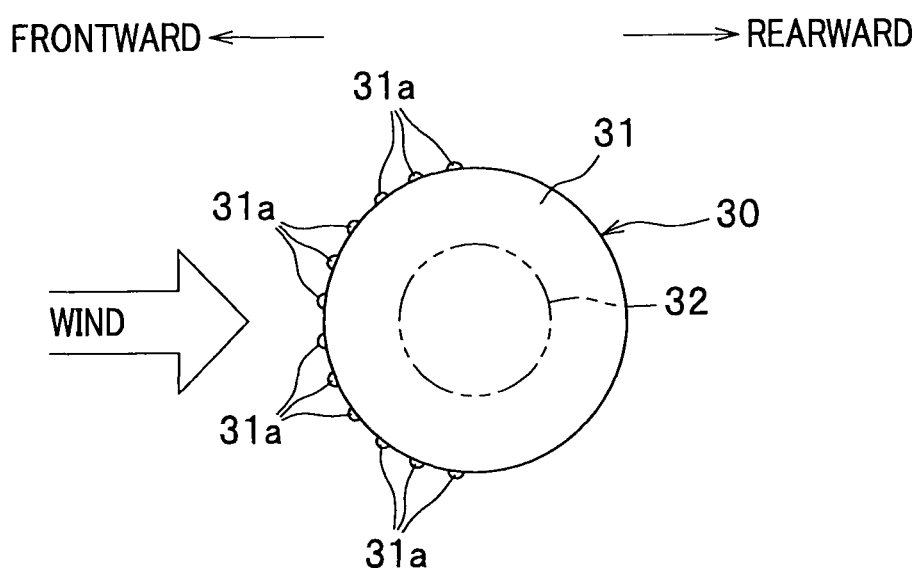
FIG. 4 is a view of a base part of the shaft according to the first embodiment seen from above.

Each rib 31a is arranged in equal distance in the circumferential direction of the shaft 30 in a semicircular part of the shaft 30 which faces toward the front side of the vehicle body as shown in FIG. 4.

If the shaft 30 is injection molded, the shaft 30 is removed from a die assembly by moving the shaft 30 in the axial direction of the shaft 30. If the rib 31a is projected along the axial direction of the shaft 30 as described above, the rib 31a can be smoothly removed from the die assembly when the shaft 30 is moved in the axial direction from the die assembly. Furthermore, because the rib 31a is not projected outward beyond the outer circumferential surface of the flange 33, the shaft 30 is easily removed from the die assembly.

When the shaft 30 is erected on the mirror base 10, and the mirror housing 20 is attached to the shaft 30 as shown in FIG. 2, each rib 31a which is formed at the lower part of the shaft 30 is exposed in the gap S between the top surface 11 of the mirror base 10 and the bottom surface 21 of the mirror housing 20.

The outer mirror 1 configured as described above has the following advantage.

When a wind blowing through the gap S between the mirror base 10 and the mirror housing 20 hits the ribs 31a formed on the outer circumferential surface of the shaft 30 and is reflected thereby, phase difference is generated between a pressure fluctuation generated at the ribs 31a and a pressure fluctuation generated at the other areas, and the reflection directions of the pressure fluctuations are dispersed, whereby the pressure fluctuations get balanced out.

Thus, the outer mirror 1 allows to reduce the whistling noise generated by the wind which hits the shaft 30 exposed in the gap S between the mirror base 10 and the mirror housing 20.

The first embodiment of the present invention has been described as above, however, the present invention is not limited to the first embodiment and may be appropriately modified without departing from the sprit of the present invention.

For example, although the convex-shaped part is formed by the rib 31a whose axial cross section is semicircular in the first embodiment as shown in FIG. 4, the convex-shaped part may be formed in any other shape. Thus, the convex-shaped part may be formed by a projection whose shape is rectangular or a projection which projects in an acute angle. However, since a whistling noise (edge tone) may be generated when a wind hits a corner part of the protrusion, it is preferable to form the convex-shaped part with a moderately curved surface.

Figure 5A:
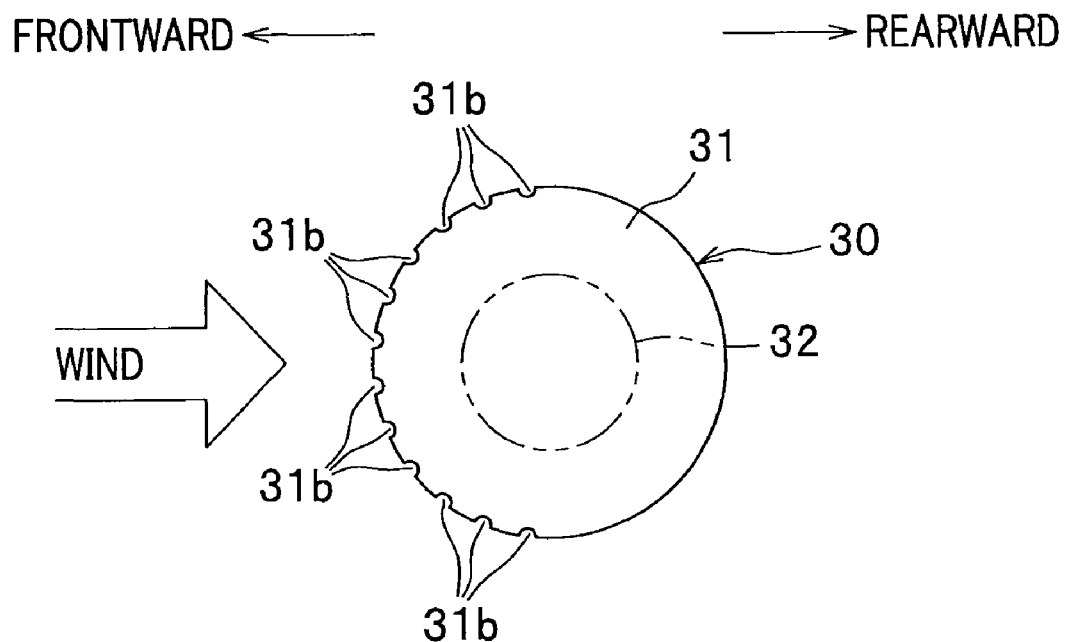
FIG. 5A is a view showing groove portions formed on the external circumferential surface of the shaft according to the first embodiment seen from above.

It is also possible to reduce a whistling noise by forming a plurality of groove portions 31b . . . on the outer circumferential surface of the base part 31 as shown in FIG. 5A. With this configuration, when a wind hits the groove portions 31b formed on the outer circumferential surface of the shaft 30 and is reflected thereby, phase difference is generated between a pressure fluctuation generated at the groove portions 31b and a pressure fluctuation generated at the other areas, and the reflection directions of the pressure fluctuations are dispersed, whereby the pressure fluctuations get balanced out. Thus, the outer mirror 1 employing this configuration also allows to reduce the whistling noise generated by the wind which hits the shaft 30 that is exposed in the gap S between the mirror base 10 and the mirror housing 20.

Although the groove portions 31b are not limited to any particular shape, the shaft 30 can be smoothly removed from the die assembly if the groove portions 31b are formed along the axial direction of the shaft 30. The groove portion 31b may be formed to be a rectangular groove or an acute-angled groove. However, since a whistling noise (edge tone) may be generated when a wind hits a corner part of the groove portion 31b, it is preferable to form the groove portion 31b with a moderately curved surface.

Moreover, waveform concave-convex portions which are formed by continuously providing a convex portion and a concave portion may be provided around the outer circumferential surface of the shaft 30 to thereby reduce a whistling noise.

Figure 5B:
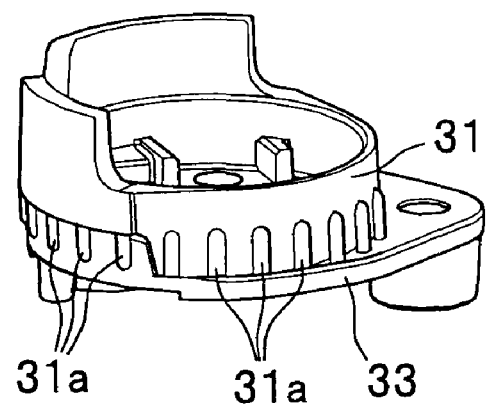
FIG. 5B is a perspective view of a base part which is formed separately from a supporting part.

The base part 31 and the supporting part 32 are integrally formed in the first embodiment as shown in FIG. 3, however, the base part 31 may be separately formed as shown in FIG. 5B.

The shaft 30 is fixed to the top surface of the mirror base 10 in the first embodiment as shown in FIG. 2, however, the shaft 30 and the mirror base 10 may be integrally formed.

A sponge or non-woven fabric may be attached to the outer circumferential surface of the shaft 30 by an adhesive tape or the like so that concave portions or convex portion are formed by a fine concave-convex pattern of the sponge or the non-woven fabric.

Second Embodiment

A second embodiment of the outer mirror is described below.

Figure 7:
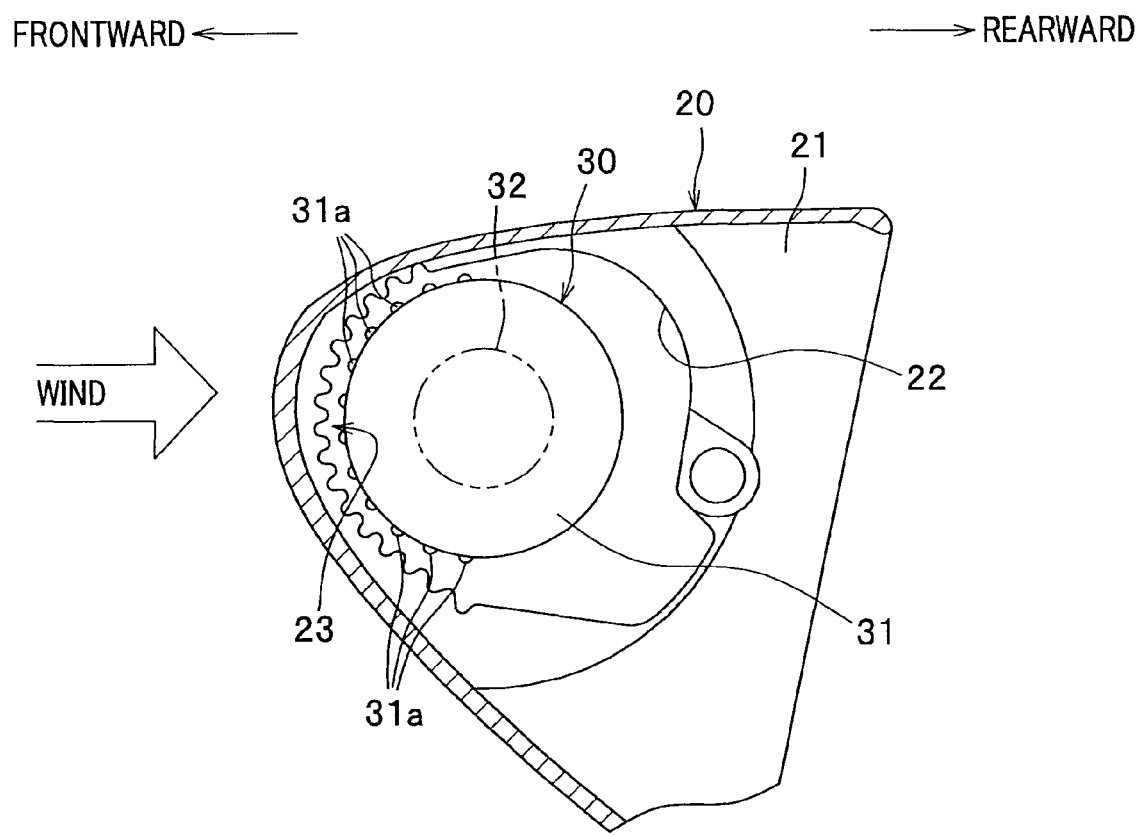
FIG. 7 is a view of a lower end face of a mirror housing of the outer mirror according to the second embodiment seen from above.

In the outer mirror 1 according to the second embodiment, the opening 22 through which the shaft 30 is inserted is formed on the bottom surface 21 of the mirror housing 20 as shown in FIG. 7. Waveform convex-concave portions 23 which are formed by a series of semicircular concave portions and convex portions are formed on a vehicle front-side semicircular part of the inner circumferential surface of the opening 22.

Since the mirror housing 20 is rotatably attached to the shaft 30, there is a space between the inner circumferential surface of the opening 22 of the mirror housing 20 and the outer circumferential surface of the base part 31 of the shaft 30 all over the periphery of the shaft 30, which is inserted through the opening 22.

Figure 6:
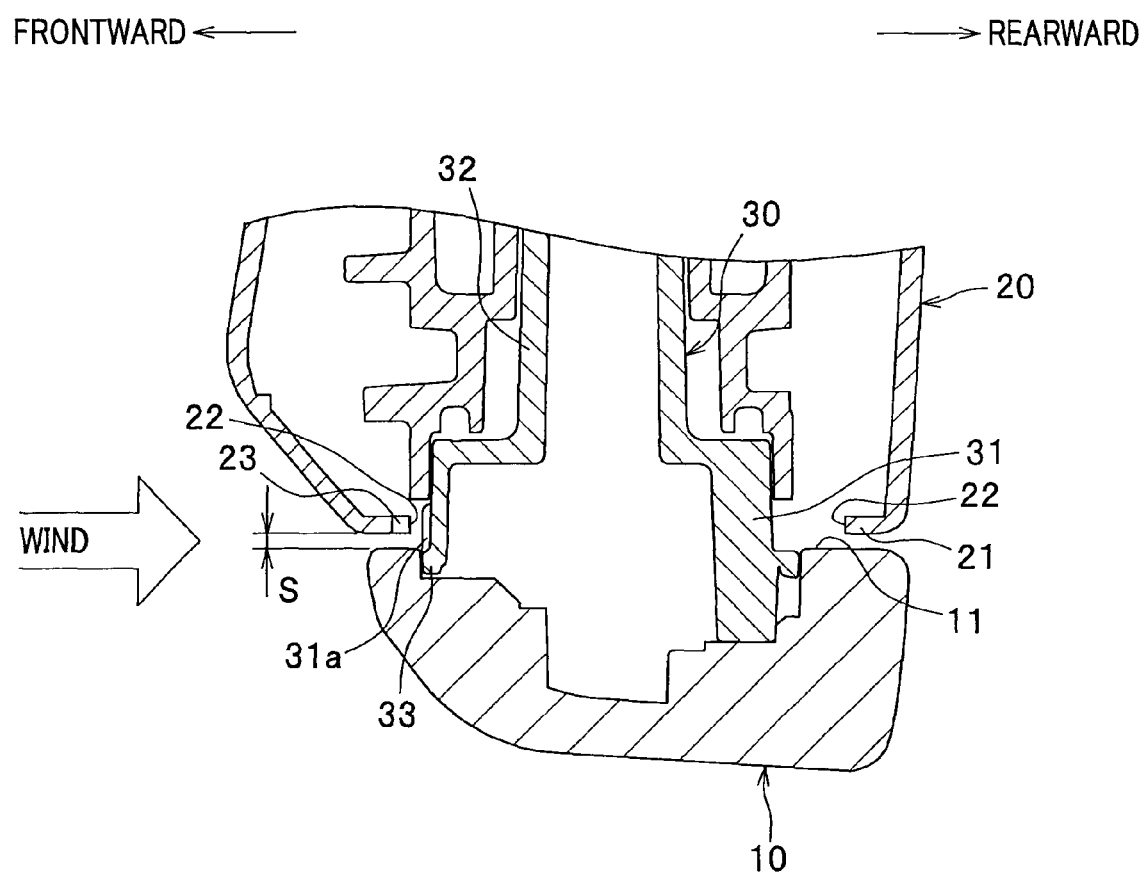
FIG. 6 is a sectional side view of an outer mirror according to a second embodiment of the present invention.

Thus, when a wind blowing into the gap S between the mirror base 10 and the mirror housing 20 shown in FIG. 6 hits the outer circumferential surface of the shaft 30 from the front side and is reflected thereby, a pressure fluctuation generated by the wind hits the inner circumferential surface of the opening 22. If the inner circumferential surface of the opening 22 is flat, a whistling noise may be generated when the pressure fluctuation hits the inner circumferential surface of the opening 22.

In the outer mirror 1 according to the second embodiment, when the wind blowing into the gap S between the mirror base 10 and the mirror housing 20 hits the outer circumferential surface of the shaft 30, a pressure fluctuation is generated by the wind and the pressure fluctuation further hits the concave-convex portions 23 of the opening 22 of the mirror housing 20. When the pressure fluctuation hits the concave-convex portions 23, a phase difference is generated between a pressure fluctuation generated at a concave portion and a pressure fluctuation generated at a convex portion, and the reflection directions of the pressure fluctuations are dispersed, whereby the pressure fluctuations get balanced out.

In the outer mirror 1 according to the second embodiment, the ribs 31a formed on the outer circumferential surface of the shaft 30 and the concave-convex portions 23 formed on the inner circumferential surface of the opening 22 of the mirror housing 20 reduces pressure fluctuations generated by a wind to a large extent. Thus, a whistling noise can be reliably reduced which is generated by a wind hitting the shaft 30 exposed in the gap S between the mirror base 10 and the mirror housing 20.

The concave-convex portions 23 are formed by a series of semicircular concave portions and convex portions in the second embodiment as shown in FIG. 7, however, the shape of portions which form the concave-convex portions 23 is not limited to any particular shape. The concave-convex portions 23 may be formed by a series of rectangular concave or convex portions or acutely-angled concave or convex portions. However, it is preferable to form the concave-convex portions 23 with moderately curved concave and convex portions since a whistling noise (edge tone) may be generated when a wind hits a corner part of the rectangular concave or convex portions or acutely-angled concave or convex portions.

In the second embodiment, a whistling noise is reduced by the concave-convex portions 23 which are formed by a series of the semicircular concave and convex portions, however, it is also possible to reduce a whistling noise by forming either one type of concave portions or convex portions on a vehicle front-side part of the inner circumferential surface of the opening 22 so that the pressure fluctuations generated by the wind hitting the outer circumferential surface of the shaft 30 hits the concave portions or convex portions to get balanced off.

In the second embodiment, the concave-convex portions 23 are provided by forming a series of the concave portions and the convex portions from the upper edge portion to the lower edge portion of the inner circumferential surface of the opening 22 of the mirror housing 20, however, a horizontal step may be formed on the inner circumferential surface of the opening 22 and the concave-convex portions 23 may be formed either of the upper stage or the lower stage of the step. In this configuration, when the concave-convex portions 23 are moved from a die assembly in the axial direction of the mirror housing so as to remove the concave-convex portions 23 from the die assembly, the concave-convex portions 23 can be smoothly removed from the die assembly because the concave-convex portions 23 do not protrude inward over the opening 22.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An outer mirror comprising:
    a mirror base which is attached to a side surface of a vehicle body;
    a shaft which is erected on the mirror base and has a base portion attached to the mirror base and a support portion; and
    a mirror housing which is provided with a mirror for reflecting a rearward of the vehicle body and is rotatably supported by the support portion of the shaft such that a top surface of the mirror base and a bottom surface of the mirror housing form a gap exposing a portion of the base portion of the shaft,
    wherein the portion of the base portion of the shaft has at least one of a plurality of concave portions and a plurality of convex portions on an outer circumferential surface of the portion of the base portion of the shaft, the at least one of the plurality of concave portions and the plurality of convex portions is positioned on a front side of the vehicle body such that the at least one of the plurality of concave portions and the plurality of convex portions reflects a wind blowing through the gap by generating a pressure fluctuation.

2. The outer mirror according to claim 1, wherein the plurality of convex portions is a plurality of ribs which protrudes along an axial direction of the shaft.

3. The outer mirror according to claim 1, wherein the plurality of concave portions is a plurality of grooves provided along an axial direction of the shaft.

4. The outer mirror according to claim 1, wherein the mirror housing has at least one of a plurality of concave portions and a plurality of convex portions formed on an inner circumferential surface of an opening of the mirror housing through which the shaft is inserted.

5. The outer mirror according to claim 4, wherein the at least one of the plurality of concave portions and the plurality of convex portions of the mirror housing is formed on a vehicle front side semicircular portion of the inner circumferential surface of the opening.

6. The outer mirror according to claim 4, wherein the concave portions and the convex portions of the mirror housing have semicircular shapes such that a wave shape concave-convex portion is formed by continuously providing the concave portions and the convex portions on the inner circumferential surface of the opening of the mirror housing.

7. The outer mirror according to claim 1, wherein the at least one of the plurality of concave portions and the plurality of convex portions is formed in an equal distance in a circumferential direction of the shaft.

8. The outer mirror according to claim 2, wherein the at least one of the plurality of concave portions and the plurality of convex portions is formed in an equal distance in a circumferential direction of the shaft.

9. The outer mirror according to claim 3, wherein the at least one of the plurality of concave portions and the plurality of convex portions is formed in an equal distance in a circumferential direction of the shaft.

10. The outer mirror according to claim 4, wherein the at least one of the plurality of concave portions and the plurality of convex portions is formed in an equal distance in a circumferential direction of the shaft.

* * * * *